No. 744,524. PATENTED NOV. 17, 1903.
H. W. GANDER.
TEA OR COFFEE POT.
APPLICATION FILED JUNE 13, 1903.
NO MODEL.
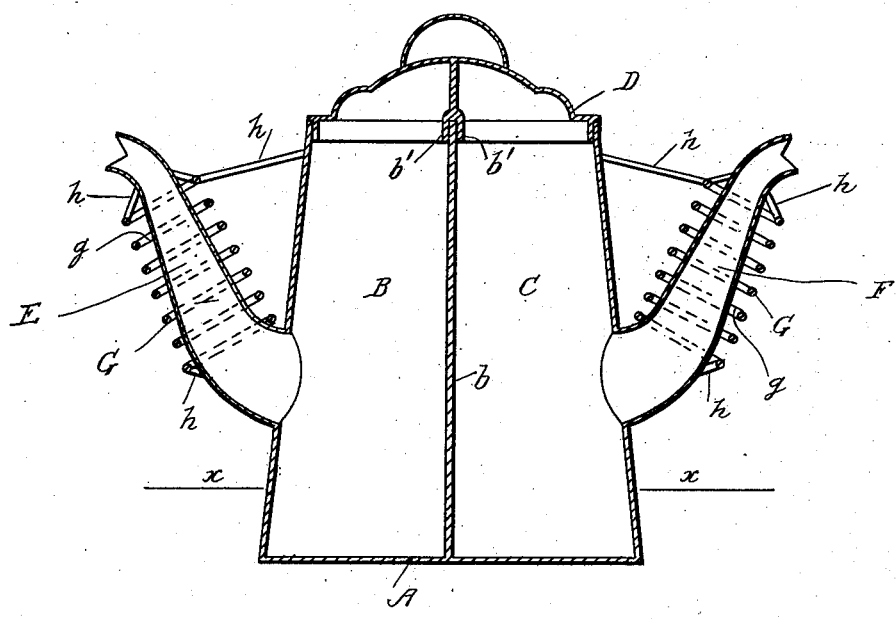
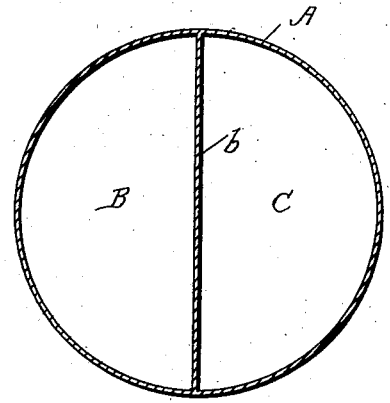
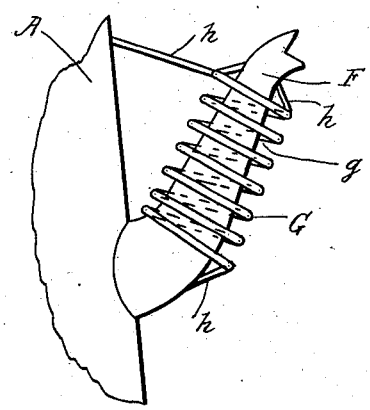
WITNESSES
Wm N. Bates
Walter Allen
INVENTOR
Harry W. Gander
by Herbert W. T. Jenner
Attorney No. 744,524. Patented November 17, 1903.

UNITED STATES PATENT OFFICE.

HARRY W. GANDER, OF RUDY, PENNSYLVANIA.

TEA OR COFFEE POT.

SPECIFICATION forming part of Letters Patent No. 744,524, dated November 17, 1903.

Application filed June 13, 1903. Serial No. 161,317. (No model.)

*To all whom it may concern:*

Be it known that I, HARRY W. GANDER, a citizen of the United States, residing at Rudy, in the county of Montgomery and State of Pennsylvania, have invented certain new and useful Improvements in Tea or Coffee Pots; and I do hereby declare the following to be a full, clear, and exact description of the invention, such as will enable others skilled in the art to which it appertains to make and use the same.

This invention relates to tea and coffee pots; and it consists in the novel construction and combination of the parts hereinafter fully described for pouring two kinds of liquid alternately.

In the drawings, Figure 1 is a vertical section through the tea and coffee pot. Fig. 2 is a sectional plan view taken on the line $x\ x$ in Fig. 1. Fig. 3 is a detail side view of one of the spouts and handles.

A is the pot, which is divided into two compartments B and C by a vertical partition $b$, arranged at its middle part.

D is a lid of any approved construction, which is common to the two compartments B and C. The two compartments have no communication with each other, and the lid is provided with a forked rib $b'$, which fits over the top edge of the partition and forms a tight joint. The compartment B has a spout E, and the compartment D has a spout F. These two spouts project upon opposite sides of the pot A, so that the spout of one compartment forms the handle for the other compartment.

In order to protect the hand from the heat of the spouts, each spout is surrounded with a handle-piece G of coiled wire, arranged at a distance from the spout, so that an air-space $g$ is formed between the wire and the spout. These handle-pieces are held in position by distance-pieces $h$, which are connected to the spouts or to the main portions of the pot or to both.

Different liquids, such as tea and coffee, are placed in the two compartments of the pot and are poured out as required.

It will be seen that when liquid is being poured from one compartment it is impossible to pour any liquid out of the other compartment.

What I claim is—

1. The combination, with a pot having a partition which divides it into two compartments, of a separate pouring-spout for each said compartment, handle-pieces of coiled wire surrounding the said spouts and having their ends secured to them and having their middle parts separated from the said spouts by air-spaces, and braces arranged between the upper end portions of the said handle-pieces and the adjacent sides of the pot.

2. The combination, with a pot having a partition which divides it into two compartments, of a separate pouring-spout for each said compartment, and a handle-piece of coiled wire surrounding each said spout and separated from it by an air-space.

In testimony whereof I affix my signature in presence of two witnesses.

HARRY W. GANDER.

Witnesses:
W. S. SLOTTERER,
AMELIA C. SLOTTERER.